(No Model.)

M. C. MASON.
DISH WASHER.

No. 272,894. Patented Feb. 27, 1883.

Witnesses,

Inventor.
Malinda C. Mason
per F. F. Warner
her Attorney.

UNITED STATES PATENT OFFICE.

MALINDA C. MASON, OF CHICAGO, ILLINOIS.

DISH-WASHER.

SPECIFICATION forming part of Letters Patent No. 272,894, dated February 27, 1883.

Application filed July 5, 1882. (No model.)

*To all whom it may concern:*

Be it known that I, MALINDA C. MASON, of Chicago, in the county of Cook and State of Illinois, have invented certain new and useful Improvements in Dish-Washers, of which the following, in connection with the accompanying drawings, is a specification.

Figure 1:
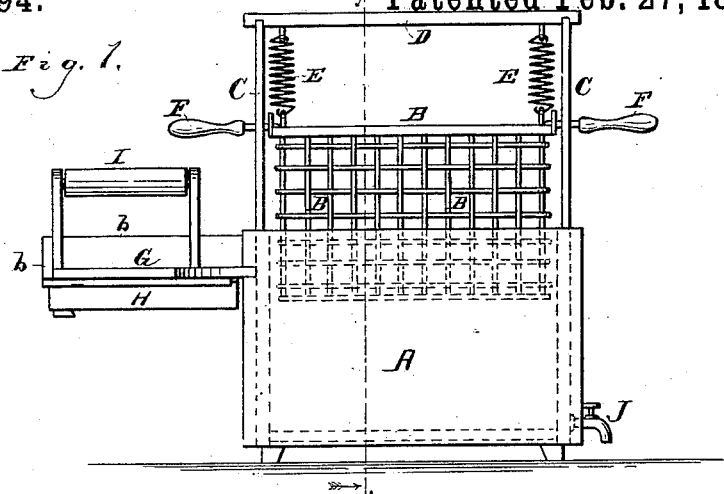
Figure 2:
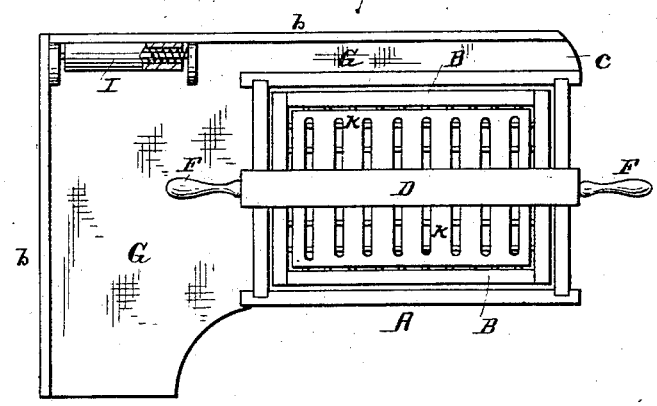
Figure 3:
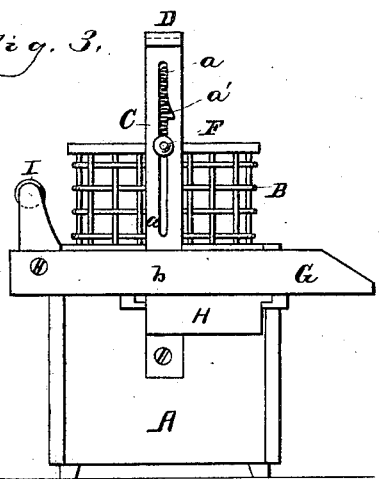
Figure 4:
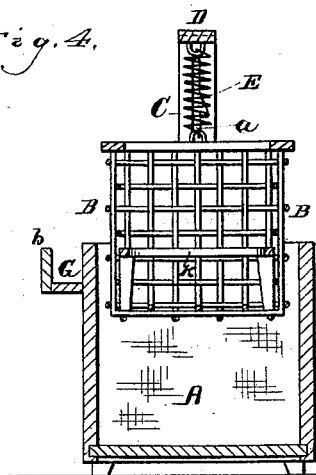

In the drawings, Figure 1 is a front elevation of a dish-washer embodying my invention. Fig. 2 is a top or plan view thereof. Fig. 3 is an end view of the same; and Fig. 4 is a section in the plane of the line $x\,x$ of Fig. 1, viewed in the direction indicated by the arrow there shown.

Like letters of reference indicate like parts.

A represents a reservoir, which may be made either of wood, metal, or any suitable material.

B is a basket or dish holder or receiver, made perforate, and adapted to enter the reservoir A and capable of being raised and lowered therein. This basket I make, by preference, of open wire-work; but any perforated receiver adapted to hold the dishes will serve the same purpose, as will hereinafter more fully appear.

C C are uprights extending upward from the reservoir A, and D is a cross-bar connecting the upper ends of the said uprights.

E E are close spiral springs, depending from the bar D, and suspending the basket B in the upper part of the reservoir A, in order that the basket when loaded may be moved up and down with facility in the reservoir.

F F are handles applied to the basket B to further facilitate the operation of raising and lowering it; and to prevent a swaying movement of the basket while it is being raised and lowered, I extend these handles through slots $a\,a$ in the uprights C C; and $a'\,a'$ are notches, into which the said handles may catch, in order that the loaded basket may thereby be suspended or held in the upper part of the reservoir A.

G is a shelf applied to the reservoir A, and H is a drawer underneath the said shelf.

I is a retracting-roller, to which in practice I connect a towel, which the roller will automatically wind upon itself, and also permit the unwinding of the towel, the said roller being similar in its operation to a well-known class of curtain-rollers.

The shelf G extends behind the reservoir A, as shown, and its rear edge and its outer side are provided with guards or edge-pieces $b\,b$. The shelf G has an inclination, such as to drain any water which may be upon it around and back of the reservoir A, so that this water will be drained off at the open end $c$.

J is a faucet or waste-pipe for drawing off the liquid contents of the reservoir A. K is a plate-rack.

To use this washer for the purpose for which it is intended I place the dishes either edgewise in the rack K or with their bottoms upward in the basket B, so that the dishes will overlap each other, thus leaving a considerable space between each dish, first filling the reservoir A with hot water containing a suitable quantity of soap or other detergent substance. I then move the basket up and down in the reservoir with sufficient rapidity to cause the water to flow into the basket and around and upon and between the dishes, and out again through the meshes or perforations of the basket. This movement of the water will be caused, as will be perceived, by the movement of the basket. In other words, the dishes will be submerged in the water and moved therein, which movement will agitate the water and result in cleaning the dishes, for the water will rush in over and about the dishes and be drained therefrom as the basket is moved. After this movement has been continued sufficiently to make the dishes clean, I raise the basket and set the handles F F in the notches $a'\,a'$, which will support the basket high enough to permit all the water to leave it. I then remove the dishes and place them on the shelf G to dry. Ordinarily, when hot water is employed, the dishes will quickly become dry, as they will then be hot enough to cause what little water that may be upon them to evaporate rapidly; but if it should be desirable to wipe the dishes the towel on the roller I may be used for that purpose; or, where more particularity is desired, I use soft mittens, with which I rub and polish the plates. These mittens and some extra towels may be kept in the drawer H.

In practice this washer should be arranged where it may be conveniently filled and drained, and it may either be portable or be built into some suitable portion of the kitchen.

I do not here intend to restrict myself to any particular means to aid the work of raising and lowering the basket, as it is obvious that it may be raised and lowered in various ways. For example, a lever and also a crank movement may be employed for that purpose.

It is also obvious that the basket B may be rendered vertically yielding in various ways.

I do not regard either the shelf G, with its drawer, or the roller I or the rack K, an absolutely essential part of my invention; but I prefer to use them substantially in the manner described as auxiliaries.

I recommend, excepting for glassware, the use of very hot water—say nearly to the boiling-point, which, of course, could not be borne by the naked hands. Water so hot as this will effectually remove all grease and dirt and render the dishes clean in from one to three minutes' time. I thus provide suitable means for using water hot enough to do the work well and quickly. In case a large basket is necessary, so as to adapt the washer for use with advantage in hotels and restaurants, it may be counterbalanced by more than two springs or by stiffer springs.

Having thus described my invention, what I claim as new, and desire to secure by Letters Patent, is—

1. The combination, in a dish-washer, of the fixed tank or reservoir A, the perforated or meshed basket or dish-holder B, and springs sustaining the said basket yieldingly in the said tank, substantially as and for the purposes specified.

2. The combination, substantially as described, in a dish-washer, of the reservoir A, the meshed or perforated basket or dish-holder B, arranged in the said reservoir, the vertically-slotted uprights C C, the cross-bar D, the springs E E, suspending the said basket yieldingly in the said reservoir, and the handles or arms F F, applied to the said basket and passing through the slots in the said uprights, for the purposes set forth.

3. The combination, in a dish-washer, of the reservoir A, the meshed or perforated basket or dish-holder B, the plate-rack K, the uprights or guides C C, having therein the slots $a\ a$ and the notches $a'\ a'$, the cross-bar D, the springs E E, and the handles F F, all arranged substantially as shown and described with relation to each other, and operating substantially as and for the purposes set forth.

MALINDA C. MASON.

Witnesses:
F. F. WARNER,
l. B. HULPENNY.